3,812,101
NOVEL PROCESS FOR PREPARING I-SUBSTITUTED BENZODIAZEPINE DERIVATIVES
Hisao Yamamoto, Nishinomiya, Shigeho Inaba, Takarazuka, Toshiyuki Hirohashi, Ashiya, Michihiro Yamamoto, Toyonaka, Kikuo Ishizumi and Mitsuhiro Akatsu, Ikeda, Isamu Maruyama, Minoo, Yoshiharu Kume, Takarazuka, Kazuo Mori, Kobe, and Takahiro Izumi, Takarazuka, Japan, assignors to Sumitomo Chemical Company, Limited, Osaka, Japan
No Drawing. Filed June 14, 1971, Ser. No. 153,030
Claims priority, application Japan, June 30, 1970, 45/57,650
The portion of the term of the patent subsequent to Dec. 11, 1990, has been disclaimed
Int. Cl. C07d 53/06
U.S. Cl. 260—239.3 D          4 Claims

ABSTRACT OF THE DISCLOSURE

Novel process for preparing 1-substituted benzodiazepine derivatives represented by the formula

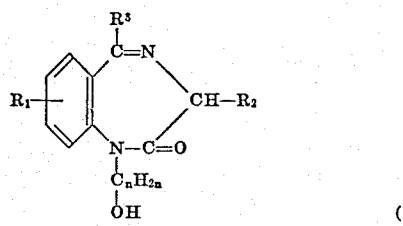

wherein $R_1$ represents hydrogen, halogen, nitro, $C_1$–$C_4$ alkoxy, trifluoromethyl or cyano; $R_2$ represents hydrogen, $C_1$–$C_4$ alkyl, phenyl or aralkyl; $R_3$ represents pyridyl or a group of the formula,

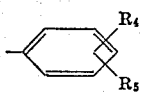

(where $R_4$ and $R_5$ are independently hydrogen, halogen, $C_1$–$C_4$ alkyl, trifluoromethyl or cyano); and $n$ represents an integer of 1 to 4, which comprises reacting an aminophenylketone derivative represented by the formula,

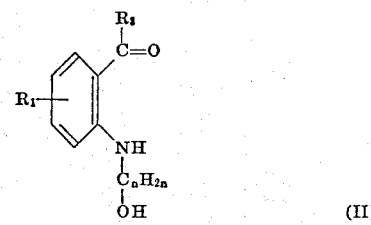

wherein $R_1$, $R_3$ and $n$ are the same as defined above, with an oxazolid-2,5-dione derivative represented by the formula

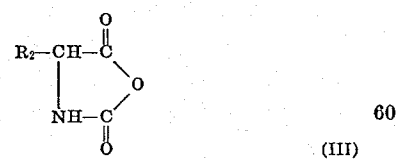

wherein $R_2$ is the same as defined above.

The 1-substituted benzodiazepine derivatives represented by the formula (I) have prominent effects as tranquilizer, muscle relaxant, antispasmodic, anticonvulsant and hypnotic.

The present invention relates to a novel process for preparing 1-substituted benzodiazepine derivatives. More particularly, the present invention pertains to a novel process for preparing benzodiazepine derivatives, and salts thereof, represented by the formula,

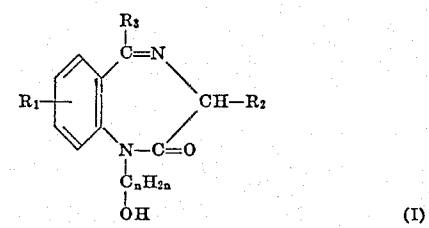

wherein $R_1$ represents hydrogen, halogen, nitro, $C_1$–$C_4$ alkoxy, trifluoromethyl or cyano; $R_2$ represents hydrogen, $C_1$–$C_4$ alkyl, phenyl or aralkyl; $R_3$ represents pyridyl or a group of the formula,

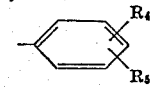

(where $R_4$ and $R_5$ are independently hydrogen, halogen, $C_1$–$C_4$ alkyl, trifluoromethyl or cyano); and $n$ represents an integer of 1 to 4.

In the compound represented aforesaid formula (I), the $C_1$–$C_4$ alkyl can be, illustratively, methyl, ethyl, n-propyl, isopropyl, n-butyl, isobutyl and tertiary butyl groups; the $C_1$–$C_4$ alkoxy includes, for example, methoxy, ethoxy, n-propoxy, isopropoxy, n-butoxy and tertiary butoxy groups; and the halogen includes chlorine, bromine, iodine and fluorine. The group of the formula, —$C_nH_{2n}$—, represents a straight chain or branched-chain alkylene group having up to 4 carbon atoms, and includes, for example, methylene, ethylene, 1-methylethylene, 2-methylethylene, trimethylene, 1-methyltrimethylene and 2-methyltrimethylene groups.

The 1-substituted benzodiazepine derivatives represented by the formula (I) have prominent effects as tranquilizer, muscle relaxant, antispasmodic anticonvulsant and hypnotic, and are of great importance as medicines.

According to the prior art, the 1-substituted benzodiazepin-2-one derivatives were obtained, for example, by synthesizing 1-unsubstituted-1,3-dihydro-2H-1,4-benzodiazepin-2-one and then hydroxyalkylating the resultant compound with a hydroxyalkyl halide, preferably after converting the 1-unsubstituted compound into a 1-sodio derivative thereof. (J. V. Earley et al., J. Med. Chem., 11, 774–777 (1968), U.S. Pat. 3,391,138).

Contrary to this known procedure, we have found, unexpectedly, that benzodiazepine derivatives of the formula (I) can be smoothly and economically prepared in high yields and of high purity by reacting an aminophenylketone derivative of the formula

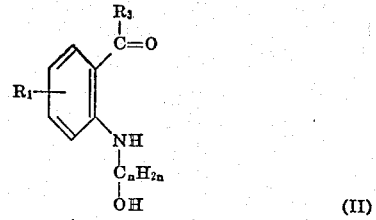

wherein $R_1$, $R_3$ and $n$ are the same as defined above, with an oxazolid-2,5-dione derivative represented by the formula,

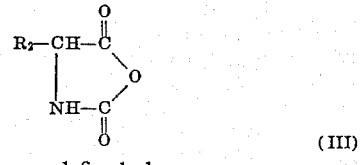

wherein $R_2$ is the same as defined above.

An object of the present invention is to provide a novel process for preparing 1-substituted benzodiazepine derivatives.

Other objects and merits of the present invention will become apparent from the description that follows.

In preparing benzodiazepine derivatives according to this invention, aminophenylketone derivatives of the formula (II) are treated with a oxazolid-2,5-dione derivative of the formula (III) in a solvent or solvent mixture. Suitable solvent include, for example, chloroform, carbon tetrachloride, methylene chloride, ethylene chloride, diethyl ether, tetrahydrofuran, dioxane, diisopropyl ether, water, methanol, ethanol, dimethylformamide, dimethyl sulfoxide or a mixture thereof. The reaction is, generally, carried out in the presence of an acid. The acid used in this process includes hydrogen chloride, hydrogen bromide, sulfuric acid, phosphoric acid, polyphosphoric acid, borontrifluoride and paratoluenesulfonic acid. The reaction is effected at a temperature ranging from $-25°$ C. to about $120°$ C., and more preferably from about $0°$ C. to about $30°$ C. Temperatures above and below the aforesaid ranges can also be employed but are less preferred. In most instances, the reaction can be conducted at room temperature or below. Pressure is not necessarily critical and the process can be conducted at atmospheric, subatmospheric or superatmospheric pressure. The process, if desired, can be conducted in an inert atmosphere, such as nitrogen, argon and the like. Although the mole ratio of the oxazolid-2,5-dione derivative to the aminophenyl ketone derivative is not critical, it is preferable to use at least stoichiometric amount of the reactant. In most cases, it is more preferable to use an excess of the oxazolid 2,5-dione derivative.

The benzodiazepine derivative obtained according to the above-mentioned process may also be isolated in the form of an acid addition salt by treatment with an acid, e.g. a mineral acid such as hydrochloric, hydrobromic, sulfuric, nitric, or phosphoric acid or an organic acid such as maleic, fumaric, succinic, formic or acetic acid.

The present invention is further disclosed in the following Examples of preferred embodiments thereof, which are presented for the purpose of illustration and are not intended to limit the scope of the invention.

EXAMPLE 1

To a solution of 1 g. of 2-($\beta$-hydroxyethyl)amino-5-chlorobenzophenone in 20 ml. of methylene chloride is added 1.2 g. of oxazolid-2,5-dione. To the mixture is added 10 ml. of ethereal hydrogen chloride under ice-cooling, and the mixture is stirred at room temperature. The reaction mixture is poured into water, basified with aqueous ammonia and extracted with methylene chloride. The extracts are combined and dried over sodium sulfate, and the solvent is removed under reduced pressure. The residue is crystallized and recrystallized from ethanol to give 1-($\beta$-hydroxyethyl)-5-phenyl-7-chloro-1,3-dihydro-2H-1,4-benzodiazepin-2-one as colorless prisms, M.P. $158°$–$160°$ C.

EXAMPLE 2

Using the procedure similar to that described in Example 1, but replacing 2-($\beta$-hydroxyethyl)amino-5-chlorobenzophenone by 2-($\beta$-hydroxyethyl)amino-5-chloro-2'-fluorobenzophenone, there is obtained 1-($\beta$-hydroxyethyl)-5-(o-fluorophenyl)-7-chloro-1,3-dihydro-2H-1,4-benzodiazepin-2-one as a pale yellow viscous oil.

The hydrochloride, obtained in the usual manner with ethereal hydrogen chloride, is recrystallized from methanol-ether to give pale yellow prisms, M.P. $194°$–$196°$ C. (decomposition).

Similarly, the following compounds are prepared.

1-($\beta$-Hydroxyethyl)-5-(o-chlorophenyl)-7-chloro-1,3-dihydro-2H-1,4-benzodiazepin-2-one, M.P. $115°$–$116°$ C.

1-($\beta$-Hydroxyethyl)-5-phenyl-7-nitro-1,3-dihydro-2H-1,4-benzodiazepin-2-one, M.P. $235°$–$236°$ C.

1-($\beta$-Hydroxyethyl)-5-phenyl-7-trifluoromethyl-1,3-dihydro-2H-1,4-benzodiazepin-2-one, M.P. $115°$–$116°$ C.

1-($\gamma$-Hydroxypropyl)-5-phenyl-7-chloro-1,3-dihydro-2H-1,4-benzodiazepin-2-one, M.P. $155°$–$156°$ C.

What is claimed is:

1. A process for preparing 1-substituted benzodiazepine derivatives and acid addition salts thereof represented by the formula,

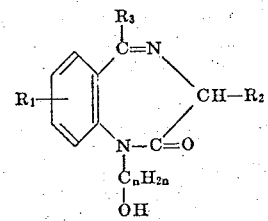

wherein $R_1$ represents hydrogen, halogen, nitro, $C_1$–$C_4$ alkoxy, trifluoromethyl or cyano; $R_2$ represents hydrogen, $C_1$–$C_4$ alkyl, or phenyl; $R_3$ represents pyridyl or a group of the formula,

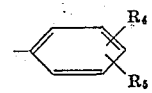

(where $R_4$ and $R_5$ are independently hydrogen, halogen, $C_1$–$C_4$ alkyl, trifluoromethyl or cyano); and $n$ represents an integer of 1 to 4; which comprises reacting an aminophenylketone derivative represented by the formula,

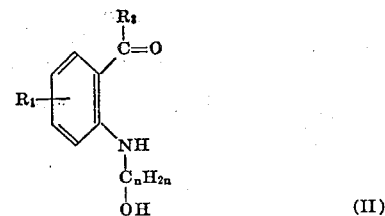

wherein $R_1$, $R_3$ and $n$ are the same as defined above, with an oxazolid-2,5-dione derivative represented by the formula,

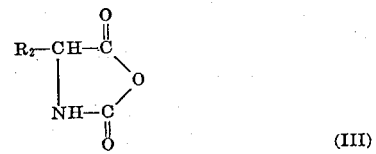

wherein $R_2$ is the same as defined above, wherein the reaction is carried out in a solvent or solvent mixture while in the presence of an acid and at a temperature ranging from $-25°$ to $+120°$ C.

2. A process according to claim 1, wherein the solvent is selected from the group consisting of chloroform, carbon tetrachloride, methylene chloride, ethylene chloride, diethyl ether, diisopropyl ether, tetrahydrofuran, dioxane, water, methanol, ethanol, dimethylformamide or dimethylsulfoxide, or mixture thereof.

3. A process according to claim 1, wherein the acid is hydrogen chloride, hydrogen bromide, sulfuric acid, phosphoric acid, polyphosphoric acid, boron trifluoride or paratoluenesulfonic acid.

4. A process according to claim 1, wherein the reaction is carried out at a temperature ranging from 0°–30° C.

References Cited

UNITED STATES PATENTS 3,391,138  7/1968  Archer et al. ____ 260—239.3 D

JOHN D. RANDOLPH, Primary Examiner

R. T. BOND, Assistant Examiner

U.S. Cl. X.R.

260—307 B, 570 AB, 296 R, 999